(12) United States Patent
Zasowski (10) Patent No.: US 10,236,944 B2
(45) Date of Patent: *Mar. 19, 2019

(54) ESTABLISHING WIRELESS COMMUNICATION BETWEEN A TRAIN AND BASE STATIONS

(71) Applicant: Swisscom AG, Bern (CH)

(72) Inventor: Thomas Zasowski, Zurich (CH)

(73) Assignee: SWISSCOM AG, Bern (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/412,730

(22) Filed: Jan. 23, 2017

(65) Prior Publication Data

US 2017/0214437 A1    Jul. 27, 2017

Related U.S. Application Data

(63) Continuation of application No. 14/153,255, filed on Jan. 13, 2014, now Pat. No. 9,554,285.

(30) Foreign Application Priority Data

Jan. 15, 2013    (EP) .................................. 13000204

(51) Int. Cl.
*H04B 7/26* (2006.01)
*H04W 4/02* (2018.01)
(Continued)

(52) U.S. Cl.
CPC .............. *H04B 7/026* (2013.01); *H04B 7/024* (2013.01); *H04B 7/0413* (2013.01);
(Continued)

(58) Field of Classification Search
CPC ...... H04B 7/024; H04B 7/026; H04B 7/0413; H04B 7/15507; H04W 16/26; H04W 48/20

See application file for complete search history.

(56) References Cited

U.S. PATENT DOCUMENTS

| | | | |
|---|---|---|---|
| 2011/0194483 A1 | 8/2011 | Ji et al. | |
| 2012/0020403 A1* | 1/2012 | Jia | H04B 7/0417 375/227 |

(Continued)

FOREIGN PATENT DOCUMENTS

| | | |
|---|---|---|
| CN | 101980458 | 2/2011 |
| CN | 102014084 | 4/2011 |

(Continued)

OTHER PUBLICATIONS

European Patent Office Search Report dated Jun. 20, 2013 for Application No. 13000204.1(6 pages).

*Primary Examiner* — Awet Haile
(74) *Attorney, Agent, or Firm* — McAndrews, Held & Malloy, Ltd.

(57) ABSTRACT

One or more communication channels may be setup for communicating between a first transceiver from a plurality of transceivers in a transportation object and a network transceiver of a communication network that is in proximity to the transportation object. Channel related data may be determined for the first transceiver; and the determined channel related data may be determined to a second transceiver that is determined to come within communication range of the network transceiver due to movement of the transportation object. The channel related data may then be used for communicating via the one or more communication channels with the second transceiver. Cooperative communication schemes may be used when communication via the one or more communication channels. The cooperative communication schemes may comprise use of one or both of spatial diversity and spatial multiplexing.

20 Claims, 5 Drawing Sheets

(51) Int. Cl.

| | |
|---|---|
| *H04B 7/026* | (2017.01) |
| *H04W 16/26* | (2009.01) |
| *H04B 7/155* | (2006.01) |
| *H04W 48/20* | (2009.01) |
| *H04B 7/024* | (2017.01) |
| *H04B 7/0413* | (2017.01) |
| *H04W 4/04* | (2009.01) |

(52) U.S. Cl.
CPC ........ *H04B 7/15507* (2013.01); *H04W 4/023* (2013.01); *H04W 4/046* (2013.01); *H04W 16/26* (2013.01); *H04W 48/20* (2013.01)

(56) References Cited

U.S. PATENT DOCUMENTS

2012/0106388 A1* 5/2012 Shimezawa ............ H04B 7/024 370/252
2013/0040558 A1* 2/2013 Kazmi ................ H04W 16/26 455/9
2014/0378154 A1 12/2014 Yi et al.

FOREIGN PATENT DOCUMENTS

| GB | 2426665 A * | 11/2006 | ............ H04W 52/46 |
|---|---|---|---|
| WO | 2011038783 A1 | 4/2011 | |
| WO | 2011/050840 A1 | 5/2011 | |

* cited by examiner

000# ESTABLISHING WIRELESS COMMUNICATION BETWEEN A TRAIN AND BASE STATIONS

CLAIM OF PRIORITY

This patent application is a continuation of U.S. patent application Ser. No. 14/153,255, filed on Jan. 13, 2014, which pursuant to 35 U.S.C. § 119 claims the filing date benefit of and right of priority to European (EP) Patent Application Serial No. 13000204.1, filed on Jan. 15, 2013. Each of above identified applications is hereby incorporated herein by reference in its entirety.

FIELD OF THE INVENTION

The present invention relates to the field of communications. In this regard, various example embodiments of the invention relate to a system and a method for establishing wireless communication between a train and base stations. Specifically, the present invention relates to a communication system and a communication method for establishing wireless communication between a train and one or more base stations of a mobile radio network which are arranged along a track travelled by the train, which may be, for example a high speed train.

BACKGROUND OF THE INVENTION

The wide spread use of mobile communication devices for wireless data communication has made it a great challenge for manufacturers and operators of telecommunications networks to provide wireless data communication with sufficient bandwidth and broadband capacity. In particular, communication related issues may arise in transportation related use scenarios. For example, on trains, where typically a large number of users attempt to use broadband data communication services simultaneously through the same limited number of base stations in reach of the train, it may be very difficult to provide sufficient data communication capacity for a passing train. Moreover, the tremendous increase of the speed of trains has augmented this problem as data communication resources need to be provided very quickly, with great bandwidth and broadband capacity, and for very short periods of time.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for establishing wireless communication between a train and base stations, substantially as shown in and/or described in connection with at least one of the figures, or otherwise as described herein, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the invention will become apparent from the following description of non-limiting exemplary embodiments, with reference to the appended drawings, in which.

DETAILED DESCRIPTION OF THE INVENTION

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g.," set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Certain example embodiments of the present disclosure may be found in a method and a system for establishing wireless communication between a train and base stations, as described in the following in more detail with reference to the attached figures. In particular, a communication system and a communication method are provided for establishing wireless broadband data communication between a moving train and base stations arranged along the track travelled by the train.

In some example embodiments, establishing wireless communication between a train and one or more base stations arranged along a track travelled by the train may comprise setting up communication channels between one or more antennas of communication relays on the train and one or more antennas of the base stations. Channel state information (CSI) may be determined and stored in a data store, and the CSI may be used for communicating via the communication channels, depending on information defining the current location of the communication relays. CSI is inherently location-specific and time-dependent. For a given position in space CSI may change gradually over time. The rate of change and thus the time over which a channel/CSI may be considered essentially constant is a channel parameter which may be referred to as the channel coherence time. Hence, over a certain time interval given by the channel coherence time, a channel/CSI may be considered constant for a specific point in space.

Using CSI in such embodiments may make it possible to reduce processing time and signalling overhead required for measuring the CSI, as the CSI may need to be determined only once in a certain period of time—e.g., at a communication relay at the head of the train, and can be reused by communication relays located further back on the train— e.g., when they subsequently pass the respective location(s) for which the CSI was measured earlier. Thus, the implicit priori information about the layout of the train track(s) and the moving direction of the train is used to determine the CSI used for communicating via the communication channels.

The position of the train track(s) and the moving direction of the train may be essentially deterministic, and all antennas of a communication relay may observe essentially the same communication channel at the same absolute position in space, over a certain time period. For example, if communication relays or antennas on the train are aligned in a row and spaced at 10 m from each other, the second communication relay or antenna from the front of the train may observe the same communication channel with the same CSI as the first communication relay or antenna at the front of the train, after the train has moved 10 m or after 10/v seconds, if v is the speed in m/s, respectively. Consequently, the CSI measured for the communication relay or antenna at the front of the train in a moving direction may be propagated to the communication relays or antennas arranged further back on the train.

In some example embodiments, a multiple-input and multiple-output (MIMO) array may be established and/or used. The MIMO array may comprise at least two communication relays arranged on the train and at one or more of the base stations. Communication may be executed concurrently via multiple communication channels of the MIMO array using cooperative communication schemes, where each communication channel is set up between one of the communication relays and one of the base stations included in the MIMO array. Using MIMO arrays and cooperative communication schemes in the non-static, dynamically changing environment of moving trains and stationary base stations makes it possible to increase communication bandwidth (capacity) and/or to improve the robustness of signal transmission (reliability) by transmitting segments of a signal via different communication channels of the MIMO array or by transmitting concurrently an identical signal on multiple communication channels of the MIMO array, for example.

In an example embodiment, the CSI may be determined by performing a CSI measurement in the communication relay arranged in a front position in a moving direction of the train or by performing a CSI measurement in a base station associated with a communication channel that includes the communication relay arranged in the front position in the moving direction of the train. Alternatively, the CSI may be retrieved from a database associated with the track travelled by the train.

In an example embodiment, the CSI used for communicating (e.g., via the communication channels of the MIMO array) may be determined depending on information about the speed of the train and information about relative positions of the communication relays on the train.

In various example embodiments, one or more cooperative communication schemes may be used for communicating via the communication channels of the MIMO array. Example cooperative communication schemes may comprise implementing spatial diversity by transmitting concurrently an identical signal on all of the communication channels of the MIMO array, and/or implementing spatial multiplexing by transmitting segments of the signal via different communication channels of the MIMO array.

In an example embodiment, the CSI, information about the speed of the train, and/or information about relative positions of the communication relays on the train may be transmitted from the train to the base stations.

In an example embodiment, the communication relays may be arranged on the train, such that the communication relays may travel essentially through a same path in space when the train travels on the track. For example, the communication relays are arranged on top of the train, and are centred with respect to both sides of the train, with one or more equally spaced communication relays occurring per train coach.

In addition to a communication system and a communication method for establishing wireless communication between a train and one or more base stations arranged along a track travelled by the train, the present disclosure also includes a computer program product comprising a computer-readable storage medium having stored thereon computer code which is configured to direct a processor arranged on a train to perform the steps of setting up communication channels between one or more antennas of communication relays arranged on the train and one or more antennas of base stations arranged along a track travelled by the train, determining and storing CSI in a data store, and communicating via the communication channels using the CSI for the communication channels, depending on information defining the current location of the communication relays.

Figure 1A:
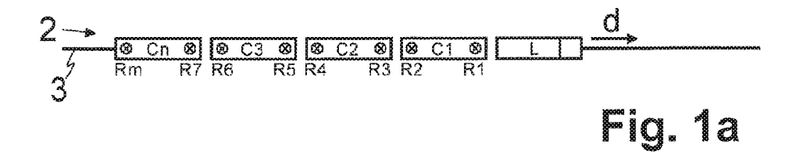
FIG. 1a is a block diagram illustrating schematically a top view of a moving train including a number of coaches with communication relays.

FIG. 1a is a block diagram illustrating schematically a top view of a moving train including a number of coaches with communication relays. Referring to FIG. 1a, there is shown a train 2. The train 2 may comprise a high speed train, configured to move at high speeds (e.g., speeds at or above 200 km/h). Nonetheless, the disclosure is not exclusively limited to high speed trains.

The train 2 may comprise one or more locomotives L, which may be coupled to one or more carts or coaches C1, C2, C3, C4, ..., Cn (short: C1-Cn). As shown in FIG. 1a (as well as in at least some of the following figures), the train 2 may move for example in a particular moving direction d, such as along a track 3—e.g., on railways including a set of rails or a monorail, such as by way of wheels and/or magnetic levitation.

The train 2 may incorporate components for use in enabling and/or supporting communications—e.g., with base stations. For example, as shown in FIG. 1a, the train 2 may incorporate a plurality of communication relays R1, R2, R3, R4, R5, R6, R7, R8, R9, Rm (short: R1-Rm). In this regard, each of the communication relays R1-Rm may comprise suitable circuitry as well as one or more antennas, for facilitating communication of signals to and/or from the relays. The communication relays R1-Rm may be configured to establish communication channels between the communication relays R1-Rm and base stations (e.g., base stations near the track 3).

In some instances, the communication relays R1-Rm may be interconnected, such as by way of a wired or wireless communication link—e.g., through WLAN, Ethernet, power-line communication (PLC), UMTS, LTE, etc.

The communication relays R1-Rm or their antennas, respectively, may be arranged in a particular manner. For example, communication relays R1-Rm or their antennas, respectively, may be arranged with known respective (geometric) distance to each other. In some instances, the individual communication relays R1-Rm or defined subsets of the communication relays R1-Rm may be arranged at equal distances to each other. The communication relays R1-Rm or their antennas, respectively, may be arranged such that they travel essentially through the same path in space (in all three dimensions) when the train travels on the track 3 during a train ride. For example, the communication relays R1-Rm are mounted at the same height with respect to the tracks 3, on top of the train 2, one or more communication relays R1-Rm per coach or cart C1-Cn, and centred with respect to both sides of the train 2, as illustrated in the top view of FIG. 1a. In an example embodiment, a further communication relay is installed on the locomotive(s) L.

In various example embodiments, a communication system may be arranged in/on the train 2, particularly to facilitate wireless communication between devices within the train 2 and wireless networks that may have access means (e.g., base stations) arranged along the track 3 (e.g., base stations). An example of such communication system is shown in, and described in more detail with respect to, FIG. 2.

Figure 2:
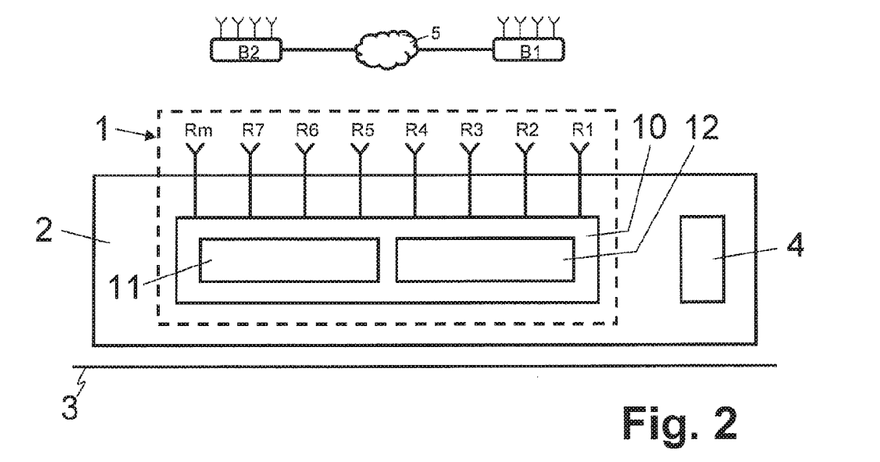
FIG. 2 is a block diagram illustrating an example configuration of a communication system for establishing wireless communication between a train and a plurality of base stations arranged along a track travelled by the train.
Figure 3A:
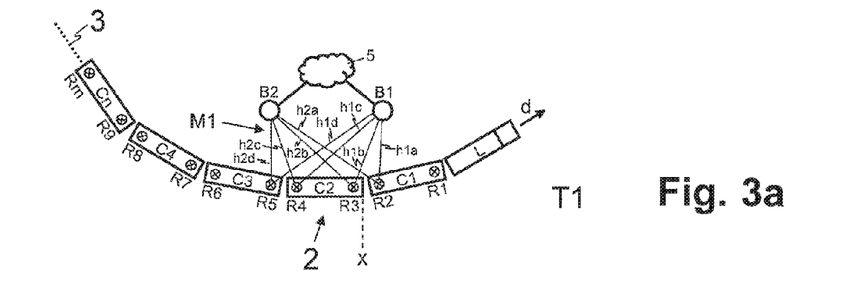
FIGS. 3a-3d illustrate schematically top views of a moving train at different times where the train has advanced through a particular position one coach at a time, such that corresponding communication channels are established between stationary base stations and the coaches that consecutively pass by the base stations.
Figure 3B:
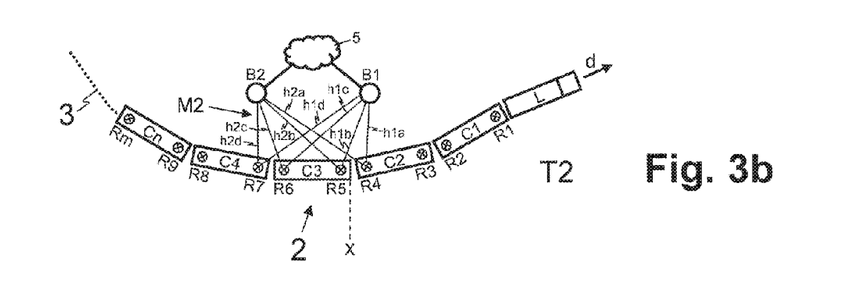
Figure 3C:
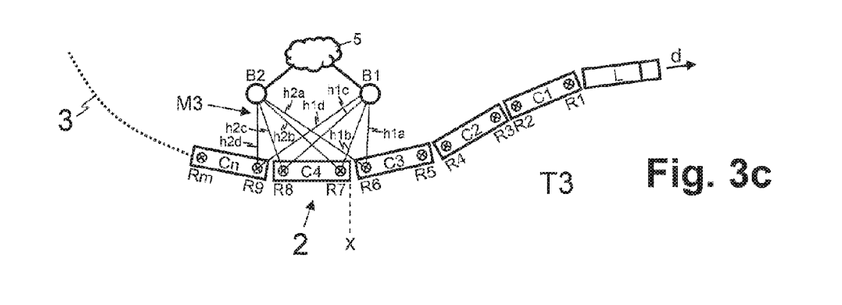
Figure 3D:
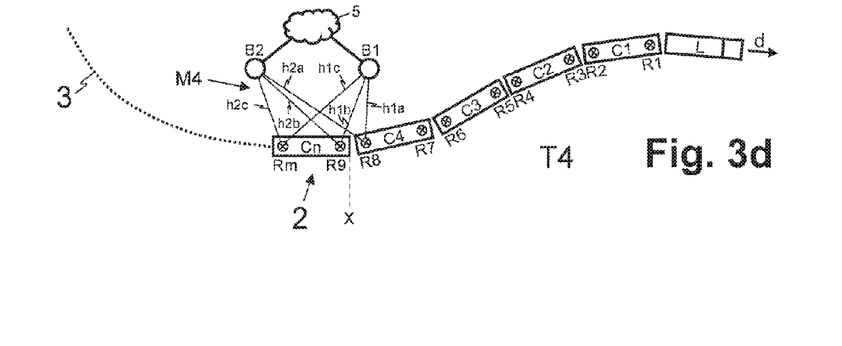
Figure 4A:
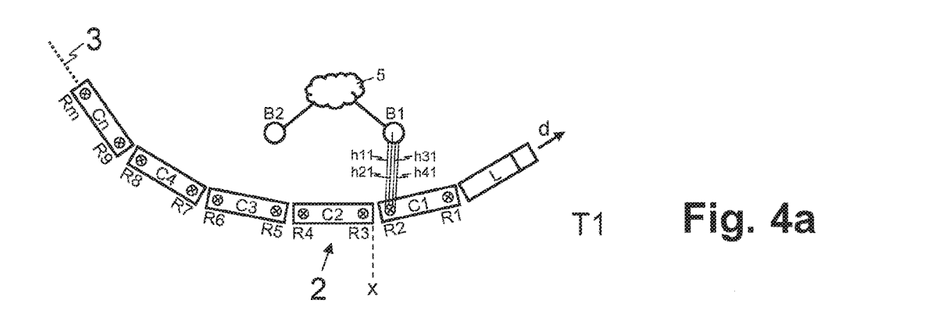
FIGS. 4a-4d illustrate schematically top views of a moving train at different times where the train has advanced through a particular position one coach at a time, such that corresponding communication channels are established between antennas of a stationary base station and antennas on coaches that consecutively pass by the base station.
Figure 4B:
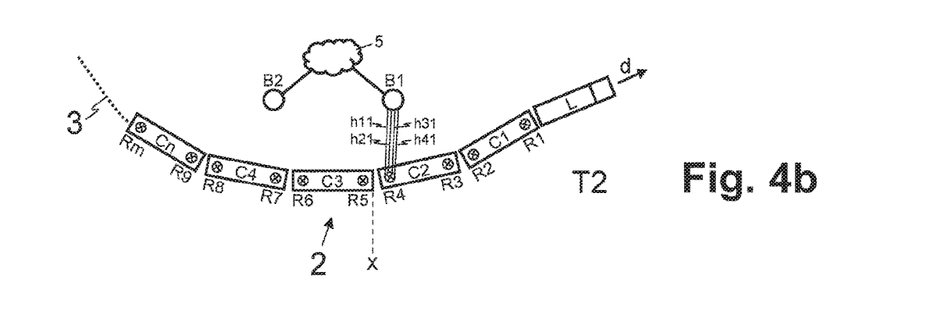
Figure 4C:
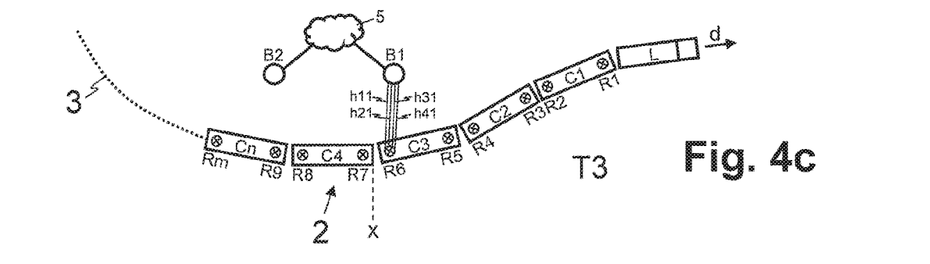
Figure 4D:
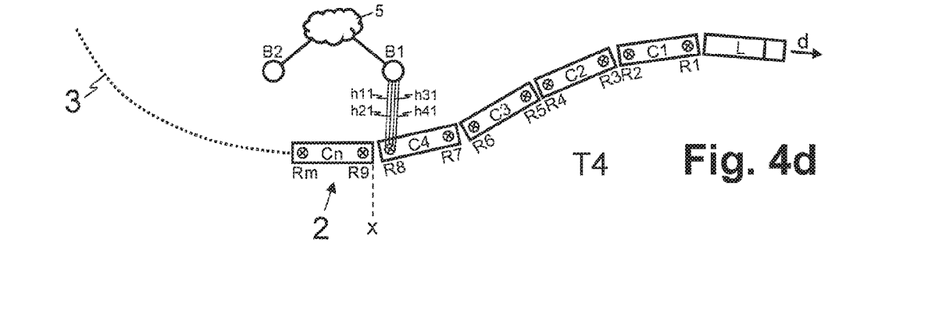

FIG. 2 is a block diagram illustrating an example configuration of a communication system for establishing wireless communication between a train and a plurality of base stations arranged along a track travelled by the train. Referring to FIG. 2, there is shown a communication system 1.

The communication system 1 may be arranged in/on a train (e.g., the train 2). In this regard, the communication system 1 may comprise suitable circuitry, and/or any other suitable communication components, for establishing wireless connectivity (and for facilitating wireless communication based thereon) between the train and one or more base stations (e.g., base stations B1, B2), which may be arranged along a track traversed by the train. Accordingly, the communication system 1 may enable mobile communication devices (e.g., mobile communication device 4) located in the train to communicate via mobile radio networks, accessed via the base stations, with other communication units.

Each of the base stations B1, B2 may comprise suitable circuitry for providing base station functions, such as in a mobile radio network 5. The mobile radio network 5 may comprise an LTE (Long Term Evolution) or LTE-Advanced network, a GSM-network (Global System for Mobile communication), a UMTS (Universal Mobile Telephone System) network, or any another cellular telephone or data network suitable for wireless communication. Further, each of the base stations B1, B2 may comprise one or more antennas. The mobile communication device 4 may comprise suitable circuitry, for enabling and/or configuring the mobile communication device 4 to communicate wirelessly—e.g., in the mobile radio network 5 via base stations B1, B2. The mobile communication device 4 may comprise a mobile telephone, a smart phone, a tablet or notebook computer, a PDA (Personal Digital Assistant) type computer, or any other suitable user carried or supported device.

For example, the communication system 1 may comprise several communication relays (e.g., the communication relays R1-Rm), for establishing communication channels between the communication relays (R1-Rm) and the base stations B1, B2. The communication system 1 may also comprise one or more operable computers, including one or more processors, configured to establish wireless communication between the train 2 and base stations B1, B2 arranged along the track 3 travelled by the train 2, thereby enabling a mobile communication device 4 located in the train 2 to communicate via the mobile radio network 5 with other communication units. Accordingly, where the mobile communication device 4 is located in the train 2, communication via the mobile radio network 5 may be enabled by the communication relays R1-Rm through communication channels established with the base stations B1, B2.

In various example embodiments, the communication system 1 may comprise several functional modules, for supporting the communication functions performed thereby. In accordance with some example embodiments, the functional modules may be implemented (by components and/or suitable circuitry of the communication system 1 may) as programmed software modules. Nonetheless, in alternative example embodiments, one or more of the functional modules may be implemented fully or partly by way of dedicated hardware components. For example, communication system 1 may comprise at least one communication unit 10, at least one channel estimator 11, and at least one data store 12. The data store 12 may comprises data storage devices or modules for storing data. The computer program code of the software modules is included in a computer program product—e.g., stored on a computer readable medium, either in memory integrated in a computer of the communication system 1 or on a tangible data carrier, which can be inserted into or connected to a computer of the communication system 1. The computer program code of the software modules controls the computer(s) or processor(s), respectively, of the communication system 1 so that the computer of the communication system 1 executes various functions described below in more detail.

The communication unit 10 may connected to the communication relays R1-Rm via wired or wireless communication links—e.g., through WLAN, Ethernet, power-line communication (PLC), UMTS, LTE, etc. In one example embodiment, the communication unit 10 may be implemented as a cooperative communication unit, which may be configured to establish a virtual multiple-input and multiple-output (MIMO) array. For example, such virtual MIMO array may comprise antennas of at least two of the communication relays R1-Rm, and one or more of the base stations B1, B2.

The channel estimator 11 may be configured to determine and/or store, such as in the data store 12, (location-specific) channel state information (CSI). The CSI may relate to various channel properties of communication channels (e.g., communication channels between the communication relays R1-Rm and the base stations B1, B2). For example, the CSI may describe how a signal propagates via the respective communication channel from a transmitter to a receiver and represents the combined effect of, for example, scattering, fading, and power decay with distance. The CSI for a communication channel between a communication relay R1-Rm and a base station B1, B2 may be location-specific in that it may indicate the channel properties of the communication channel for a given location of the respective communication relay R1-Rm—e.g., a given location along the track 3 travelled by the train 2, defining a position or location with regards to the base station B1, B2. The CSI may make it possible to adapt transmissions to current and/or estimated future channel conditions. Because the communication relays R1-Rm or their antennas, respectively, are arranged on the train 2 to travel through the same path in space, for any location on that path, the same CSI can be used for communication channels established between a communication relay R1-Rm at that respective location and a base station B1, B2 along the tracks 3. Example use scenarios of the communication system 1 with respect to the train 2 (as shown in FIG. 1a) are described in more detail with respect to FIGS. 1b and 1c.

Figure 1B:
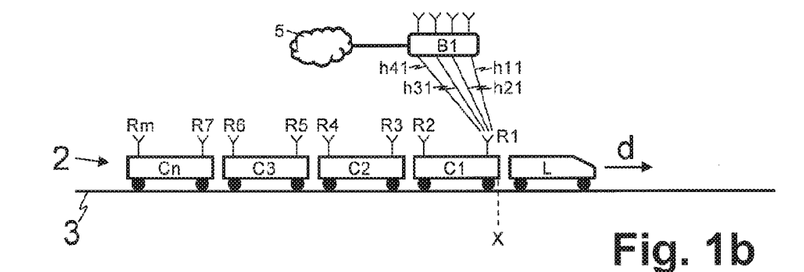
FIG. 1b is a block diagram illustrating schematically a side view of a moving train and communication channels established between a communication relay mounted on a first coach at the front of the train and antennas of a stationary base station.

FIG. 1b is a block diagram illustrating schematically a side view of a moving train and communication channels established between a communication relay mounted on a first coach at the front of the train and antennas of a stationary base station. Referring to FIG. 1b, there is shown a side view of the train 2 (as described with respect to FIG. 1a) as it moves along the track 3, passing by the base station B1.

Also shown in the particular scenario depicted in FIG. 1b are four communication channels h11, h21, h31, h41, which may be established between the antennas of base station B1 and communication relay R1 of the first coach C1, when the front of the first coach C1 at the front of the train 2 is at position X. Accordingly, in this scenario, the CSI describes the channel properties of each of these communication channels h11, h21, h31, h41.

Figure 1C:
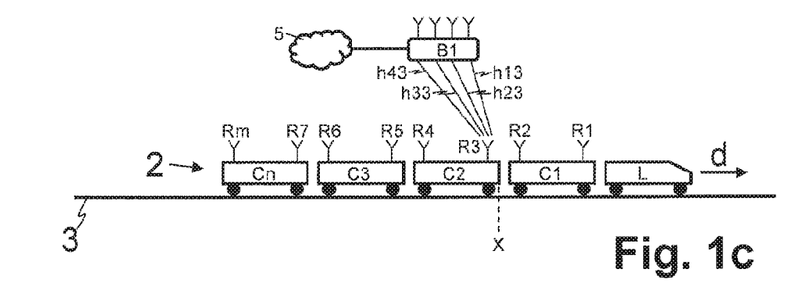
FIG. 1c is a block diagram illustrating schematically a side view of a moving train, at a time where a second coach from the front of the train is at the same position where a first coach at the front of the train was previously.

FIG. 1c is a block diagram illustrating schematically a side view of a moving train, at a time where a second coach from the front of the train is at the same position where a first coach at the front of the train was previously. Referring to FIG. 1b, there is shown a side view of the train 2 (as described with respect to FIG. 1a) as it moves along the track 3, passing by the base station B1.

In the particular scenario shown in FIG. 1c, the train 2 would have moved in a moving direction d with respect to the position of the train 2 shown in FIG. 1b by a distance of one coach or cart C1-Cn—i.e., at the time depicted in FIG. 1c, the second coach C2 from the front of the train 2 is at the same position X as the first coach C1 at the front of the train 2, at the time of the snap shot depicted in FIG. 1b. Consequently, at the position X of the train 2 shown in FIG. 1c, the CSI of the communication channels h13, h23, h33, h43 between the antennas of base station B1 and the antennas of communication relay R3 may correspond to the CSI of the communication channels h11, h21, h31, h41 between the antennas of base station B1 and the antennas of communication relay R3, at the position of the train 2 shown in FIG. 1b for some period of time, which is sometimes referred to as channel coherence time.

Accordingly, CSI determined for a communication channel(s) established through a communication relay R1 at the front of the train 2 at a position X may be used for communication channels established through communication relays R2-Rm farther back in the train 2 when these rear communication relays R2-Rm pass through the same position X. The time or position when the measured and/or estimated (location-specific) CSI applies to a rear communication relay R2-Rm on the train 2 depends on information defining the current location of these communication relays R2-Rm. For example, the current location of the communication relays R2-Rm may be defined by information defining the position of the communication relays R1-Rm relative to each other—e.g., the relative distance, and the speed of the train 2.

Referring back to FIG. 2, the channel estimator 11 may be configured to determine the CSI for communication channels h11, h21, h31, h41, such as by performing a CSI measurement in the communication relay R1 arranged in front position in moving direction d of the train 2. Alternatively, the CSI may be measured by a base station (e.g., one of the base stations B1, B2), with the channel estimator 11 receiving the CSI from the base station. For example, the CSI may be measured by the base station B1 included in the communication channel h11, h21, h31, h41 with the communication relay R1 arranged in front position of the train 2, and the channel estimator 11 may receive the CSI from the base station B1. The CSI measurement may be performed at the communication relay (e.g., communication relay R1) or respective base station (e.g., based station B1) using known measurement methods. For example, the CSI measurement may be performed by transmitting a known signal, a so-called training or pilot sequence, and estimating the CSI using the combined knowledge of the transmitted and received signal. In an example embodiment, where the CSI is determined through measurements in a communication relay of the train (e.g., communication relay R1), the channel estimator 11 may be further configured to transmit the determined CSI to the respective base station(s) (e.g., one or both of the base stations B1, B2) and/or other communication relays (e.g., the rear communication relays R2-Rm).

The communication unit 10 may connected to the communication relays R1-Rm via wired or wireless communication links—e.g., through WLAN, Ethernet, power-line communication (PLC), UMTS, LTE, etc. In one example embodiment, the communication unit 10 may be implemented as a cooperative communication unit, which may be configured to establish a virtual multiple-input and multiple-output (MIMO) array. For example, such virtual MIMO array may comprise antennas of at least two of the communication relays R1-Rm, and one or more of the base stations B1, B2.

FIGS. 3a-3d illustrate schematically top views of a moving train at different times where the train has advanced through a particular position one coach at a time, such that corresponding communication channels are established between stationary base stations and the coaches that consecutively pass by the base stations. Referring to FIGS. 3a-3d, there are shown top views of the train 2 (as described with respect to FIGS. 1a and 2) as it moves along the track 3, passing by the base stations B1, B2.

In the example scenarios depicted in FIGS. 3a-3d, time snap shots are shown of the train 2 at times T1, T2, T3, and T4 (short T1-T4), as the train 2 advances in moving direction d, by particular distance, such as by length (Ic) of one coach or cart C1-Cn. Accordingly, depending on speed (v) of the train 2 and the length Ic of a cart C1-Cn, a duration of time (Ti) between consecutive points in time T1-T4 may be defined by Ti=Ic/v. Assuming a constant speed v of the train 2 (as well as similar cart length Ic for all coaches C1-Cn), the points in time T1-T4 may be at regular intervals Ti=T4-T3=T3-T2=T2-T1. Thus, in the duration of time Ti for example, the train 2 may move forward such that, at time t, a second cart C2 takes the place that a first cart C1, arranged adjacent in front of the second cart C2, would have occupied at the time t-Ti, whereby, at the time t, the communication relays R3, R4 or antennas of the second cart C2 may be at the same position as the communication relays R1-R2 or antennas of the first cart C1 were before, at time t-T1.

Further, the communication system 1 arranged on and/or in the train 2 may be configured to established (e.g., via the communication unit 10) different (virtual) MIMO arrays. In this regard, referring to the example scenarios shown in FIGS. 3a-3d, different example (virtual) MIMO arrays M1, M2, M3, M4 (short: M1-M4) may be established, comprising in each case antennas of the base stations B1 and B2, as well as antennas of one or more communication relays (e.g., four or three of the communication relays R2-Rm). For example, the MIMO arrays M1-M4 may be configured as outlined in Table 1:

TABLE 1 example configurations for MIMO arrays M1-M4

| MIMO M1 | | MIMO M2 | | MIMO M3 | | MIMO M4 | |
|---|---|---|---|---|---|---|---|
| B1 | B2 | B1 | B2 | B1 | B2 | B1 | B2 |
| R2 h1a h2a | | R4 h1a h2a | | R6 h1a h2a | | R8 h1a h2a | |
| R3 h1b h2b | | R5 h1b h2b | | R7 h1b h2b | | R9 h1b h2b | |
| R4 h1c h2c | | R6 h1c h2c | | R8 h1c h2c | | Rm h1c h2c | |
| R5 h1d h2d | | R7 h1d h2d | | R9 h1d h2d | | — — — | |

In this regard, in the example scenarios depicted in FIGS. 3a-3d, at each of the points in time T1-T4, the MIMO arrays M1-M4 may be established between the base stations B1, B2 and, for example, four (or three) communication relays {R2, R3, R4, R5}, {R4, R5, R6, R7}, {R6, R7, R8, R9}, {R8, R9, Rm}. As the subsets of communication relays {R2, R3, R4, R5}, {R4, R5, R6, R7}, {R6, R7, R8, R9}, {R8, R9, Rm} included in the MIMO arrays M1-M4 are in the same absolute positions (assuming constant speed and cart length), communication channels h1a, h1b, h1c, h1d, h2a, h2b, h2c, h2d (short: h1a-h2d) established between the communication relays {R2, R3, R4, R5}, {R4, R5, R6, R7}, {R6, R7, R8, R9}, {R8, R9, Rm} and the base stations B1, B2 in the MIMO arrays M1-M4 may be essentially the same. Accordingly, CSI of the communication channel h1a, for example, established at T1 between the base station B1 and communication relay R2 may correspond essentially to CSI of the communication channel h1a established at T2, T3, or T4 between the base station B1 and the communication relays R4, R6, or R8, respectively. Nonetheless, CSI may exhibit temporal changes between points in time T1-T4. Examples of continuous temporal changes of the CSI for different channels (e.g., channels established via MIMO arrays M1-M4), for a time window (e.g., time window of t=T1 to t=T4), are shown in, and described in more detail with respect to, FIG. 6.

In some instances, the communication system 1 may be configured or implemented to use cooperative communications. In this regard, the communication unit 10 may be configured as a cooperative communication unit, and as such may be operable to communicate concurrently via multiple communication channels, such channels established via MIMO arrays (e.g., the communication channels h1a-h2d of the MIMO array M1-M4), such as by use of cooperative communication schemes. For example, in various example embodiments (and/or configurations based thereon), the communication unit 10 may be configured to use and/or implement as cooperative communication scheme, spatial diversity, by transmitting concurrently an identical signal on all the communication channels h1a-h2d of the MIMO array M1-M4, or spatial multiplexing, by transmitting segments of the signal via different communication channels h1a-h2d of the MIMO array M1-M4. The disclosure is not so limited, however, and other cooperative communication schemes may be applicable and used in a substantially similar manner.

FIGS. 4a-4d illustrate schematically top views of a moving train at different times where the train has advanced through a particular position one coach at a time, such that corresponding communication channels are established between antennas of a stationary base station and antennas on coaches that consecutively pass by the base station. Referring to FIGS. 4a-4d, there are shown top views of the train 2 (as described with respect to FIGS. 1a and 2) as it moves along the track 3, passing by the base stations B1, B2.

In the example scenarios depicted in FIGS. 4a-4d, time snap shots are shown of the train 2 at the T1-T4, substantially as described with respect to FIGS. 3a-3d. In the example scenario depicted in FIGS. 4a-4b, however, establishing connectivity with the base stations does not entail configuring MIMO arrays. Rather, in the example scenarios depicted in FIGS. 4a-4d, communication channels h11, h21, h31, h41 may be set up between one or more antennas (e.g., four) of a communication relay (e.g., one of the communication relay R2, R4, R6, R8) and one or more antennas (e.g., four) of a particular base station (e.g., the base station B1) when the train 2 advances in moving direction d by the length Ic of one coach or cart C1-Cn.

Accordingly, and assuming again a constant speed v of the train 2 as well as similar cart length Ic for all coaches C1-Cn, the same CSI may apply to all of the communication channels h11, h21, h31, h41. Specifically, the CSI of the communication channels h11, h21, h31, h41, for example, established at T1 between the base station B1 and communication relay R2 corresponds to the CSI of the communication channels, h11, h21, h31, h41 established at T2, T3, or T4 between the base station B1 and the communication relays R4, R6, or R8, respectively.

In some instances, the communication unit 10 of the communication system 1 may be configured to use corresponding CSI for communicating via the one or more communication channels h11, h21, h31, h41 between a communication relay R2, R4, R6, R8 and the same particular base station B1 when the respective communication relays R2, R4, R6, R8 have the same relative position with respect to that particular base station B1 at times T1, T2, T3, T4. Thus, without using any cooperative communication schemes, the communication unit 10 may use the same CSI for the communication channels h11, h21, h31, h41 established between the same base station B1 and different communication relays R2, R4, R6, R8.

In some instances, in order to communicate via the communication channels h11, h21, h31, h41 between the antennas of communication relays R1-Rm and base stations B1, B2 and/or for using cooperative communication schemes for multiple communication channels h1a-h2c of one of the MIMO arrays M1-M4, the base stations B1, B2, and communication relays R1-Rm may require the CSI of all the communication channels h11, h21, h31, h41, and h1a-h2d between the transceivers involved in the communication—i.e. the communication channels h11, h21, h31, h41, and h1a-h2d, established in each case between an antenna of one of the base stations B1, B2 and an antenna of one of the communication relays R1-Rm. Accordingly, in some example embodiments, the (cooperative) communication unit 10 and/or the base stations B1, B2 may be configured to exchange the respective CSI.

In some example embodiments, the communication unit 10 may be configured to transmit to the base stations B1, B2 information about the current speed of the train 2 and the relative positions of the communication relays R1-Rm.

In some example embodiments, there may be one or more than one communication unit 10 arranged in the train 2. For example, there may be one unit (of the communication unit 10) per cart C1-Cn, one unit per logical group of communication relays R1-Rm (e.g., the communication relays R1-Rm of two adjacent carts C1-Cn), or one unit per communication relay R1-Rm. If instances where there may be multiple communication units 10, these units may be configured to cooperate and communicate with one another—e.g., via wireless or wired communication channels—e.g., through WLAN, Ethernet, power-line communication (PLC), UMTS, LTE, etc. Likewise, the base stations B1, B2 may be controlled by one central processing unit, one processing unit per logical group of base stations B1, B2, or one processing unit per base station B1, B2, whereby in the case of multiple processing units, they are preferably interconnected to improve the overall system performance.

Figure 5:
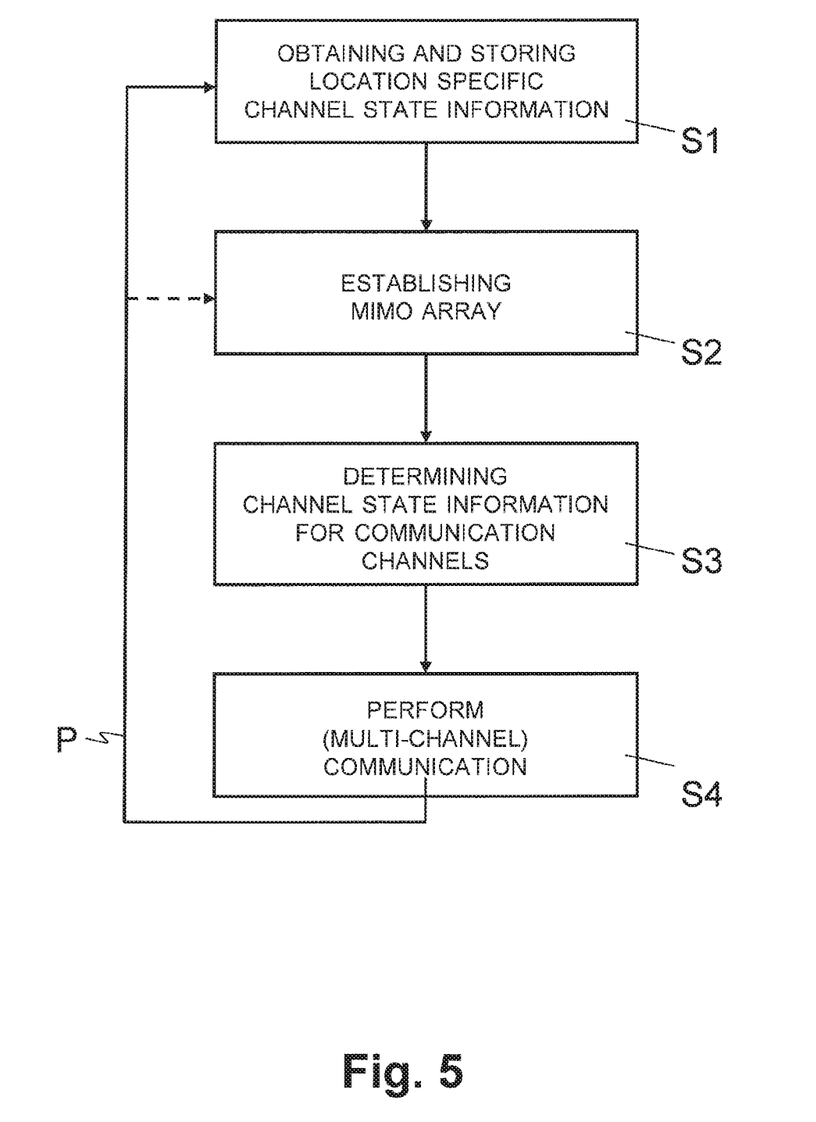
FIG. 5 is a flow diagram that illustrates an example sequence of steps for establishing wireless communication between a train and a plurality of base stations arranged along a track travelled by the train.

FIG. 5 is a flow diagram that illustrates an example sequence of steps for establishing wireless communication between a train and a plurality of base stations arranged along a track travelled by the train.

Referring to FIG. 5, there is shown sequence of example steps that may be performed (e.g., in a communication system, such as the communication system 1 or functional modules thereof) for establishing wireless communication between a train (e.g., the train 2) and a plurality of base stations (e.g., the base stations B1, B2) arranged along a track travelled by the train (e.g., the track 3 travelled by the train 2).

In example step S1, channel information (e.g., CSI), which may be location-specific, may be determined and stored (e.g., by the channel estimator 11). For example, the channel estimator 11 may determine and store CSI for the communication channels set up by the communication relay R1 at the front of the train 2 using real-time CSI measurements, which may be performed by the communication relay R1 at the front of the train 2 or by the base stations B1, B2 included in the communication channels set up by the communication relay R1 at the front of the train 2. In other instances, however, the channel estimator 11 may obtain from a CSI database (e.g., pre-measured, historic) CSI for the track 3 or a section of the track 3. The CSI database may be maintained in a centralized manner (e.g., stored in a centralized computer system remote from the train 2), or in localized manner (e.g., in a local database or lookup table on the train 2).

In example step S2, communication channels may be established, which may comprise establishing connectivity as well as (in some instances) configuring communication setups needed therefor. For example, in the scenario(s) depicted in FIGS. 3a-3d, the communication unit 10 may configure MIMO arrays (M1-M4) for cooperative communication through a plurality of channels. In this regard, the MIMO arrays M1-M4 may be established using antennas in the base stations B1 and B2 and the communication relays R2-Rm when they pass these base stations B1, B2. Nonetheless, in some instances, the communication unit 10 may establish concurrently multiple MIMO arrays between the communication relays R1-Rm of the train 2 and the plurality of base stations B1, B2 arranged along the track 3 travelled by the train 2 and within communication range—e.g., within communication range of a defined minimum communication quality. For the scenario(s) depicted in FIGS. 4a-4d, the communication unit 10 may neither establish MIMO arrays, nor use cooperative communication schemes. Rather, the communication unit 10 may merely set up communication channels—e.g., communication channels h11, h21, h31, h41 between the antennas of a base station B1 and the antennas of communication relays R2, R4, R6, R8 on the cart C1, C2, C3, C4 passing the respective base station B1.

In example step S3, channel related information for established communication channels may be determined. For example, in the scenario(s) depicted in FIGS. 3a-3d, the channel estimator 11 may determine CSI for the communication channels h1a-h2c of the established MIMO arrays M1-M4. For the scenario(s) depicted in FIGS. 4a-4d, the channel estimator 11 may determine CSI for the communication channels h11, h21, h31, h41 set up between the antennas of a base station B1 and the antennas of the communication relay R2, R4, R6, R8 arranged on a cart C1, C2, C3, C4 passing the respective base station B1. Using stored CSI (e.g., the CSI determined and stored in example step S1), the CSI for the communication channels h11, h21, h31, h41, and h1a-h2d may be determined based on the location or position of the communication relay R2-Rm included in the respective communication channel h11, h21, h31, h41, and h1a-h2d. In this regard, the location or position of the communication relays R1-Rm may be defined by their relative arrangement on the train 2—e.g., their distance from the communication relay R1 at the front of the train 2 in moving direction d, and the speed of the train 2. Various mechanisms may be used in propagating the CSI measured, in example step S1, at the front of the train 2, from the communication relay R1 to the communication relays R2-Rm further back on the train 2. For example, in some example embodiments the CSI may be propagated through data pulling or pushing functions, which may be performed by channel estimator 11 that may arranged in the communication relay R1 at the front of the train 2 (e.g., configured to perform data pushing), in a centralized communication unit 10 of the train (e.g., configured to perform data pushing and/or pulling), or in the communication relays R2-Rm located further back on the train 2 (e.g., configured to perform data pulling).

In some example embodiments, where the CSI may be retrieved from a CSI database, the location of the communication relays R1-Rm may be determined further based on the current location of the train 2 as provided by a positioning system, such as GPS (Global Positioning System), or the mobile radio network 5.

In example step S4, communication may be performed (e.g., as multi-channel communications). For example, the communication unit 10 may use the CSI determined for the communication channels h11, h21, h31, h41 and/or the communication channels h1a-h2d, or for the communication relays R1-Rm, respectively, for communicating through the communication channels. Further, in some instances, the communication may comprise additional operations. For example, for the scenario(s) depicted in FIGS. 3a-3d, cooperative communication may be performed through the communication channels of the MIMO arrays M1-M4.

The process may then loop back (as indicated by P in FIG. 5), such that the processing may continue—e.g., continuously or periodically repeating example steps S1 to S4, or in some instances only repeating example steps S2 to S4 (e.g., depending on whether CSI is determined in example step S1 through real-time measurements or retrieval of stored CSI from a CSI database or lookup table).

Figure 6:
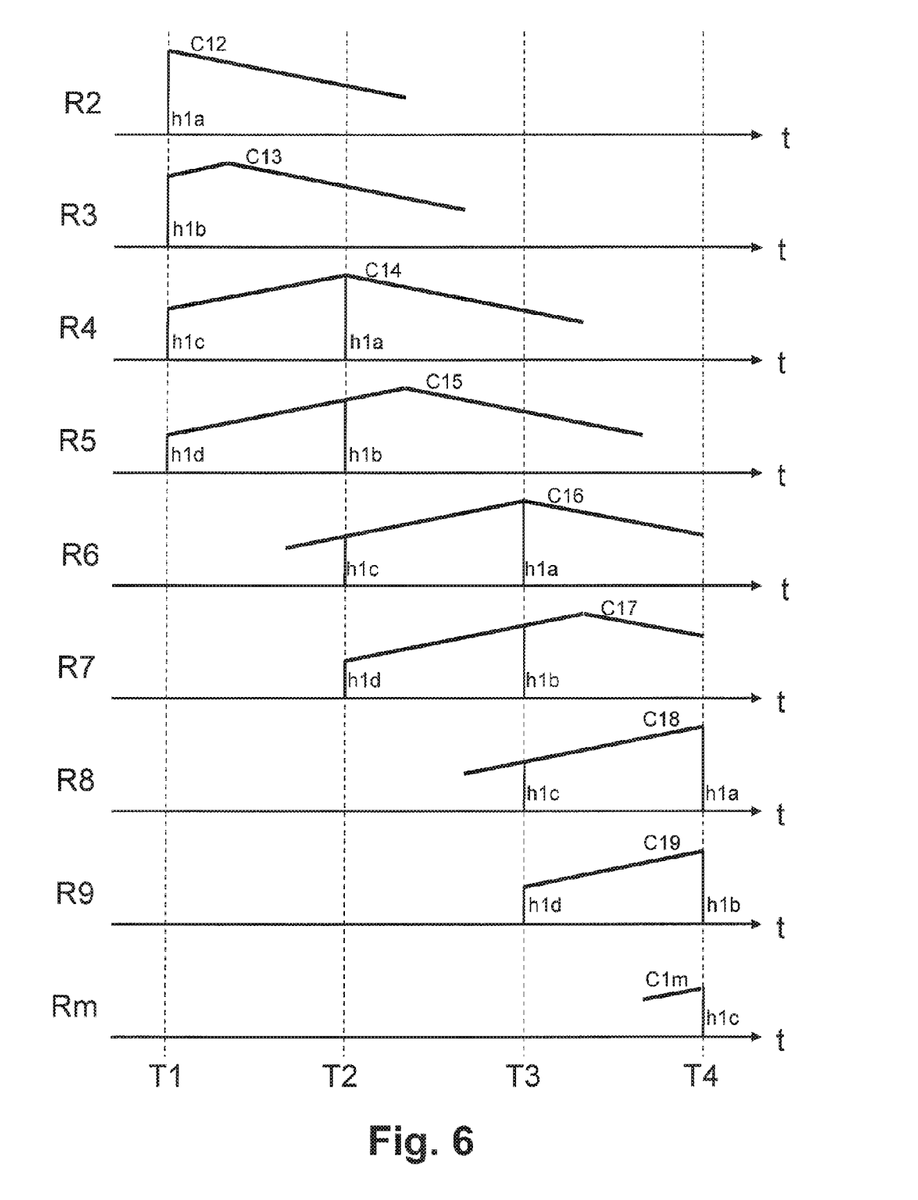
FIG. 6 is a timing chart illustrating schematically the change over time of the CSI of communication channels established between a stationary base station and antennas of communication relays on a train passing by the base station.

FIG. 6 is a timing chart illustrating schematically the change over time of the CSI of communication channels established between a stationary base station and antennas of communication relays on a train passing by the base station.

Referring to FIG. 6, there is a shown a timing chart depicting, for a time window (e.g., time window t=T1 to t=T4), the continuous temporal change of CSI for a one or more communication channels between a train and a base station—e.g., CSI: C12, C13, C14, C15, C16, C17, C18, C19, C1m (or C12-C1m for short), for communication channels established between the communication relays R2-Rm and base station B1, as the train 2, and thus the communication relays R2-Rm, pass by the base station B1 on the same path. In the example timing chart shown in FIG. 6, the references h1a, h1b, h1c, h1d indicate schematically that at the points in time T1, T2, T3, T4, the CSI C12-C1m corresponds to the CSI of the communication channels h1a, h1b, h1c, h1d as illustrated in the corresponding snap shots of FIGS. 3a-3d. As is shown in FIG. 6, the same CSI C12-C1m may be used for the communication channels established between a communication relay R1-Rm and base station B1, but shifted in time (e.g., as determined by the speed of the train 2 and the distance between the communication relays R1-Rm).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present invention may be realized in hardware, software, or a combination of hardware and software. The present invention may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
setting up one or more communication channels for communicating between a first transceiver from a plurality of transceivers in a transportation object, and a network transceiver of a communication network that is in proximity to said transportation object;
determining channel related data for said first transceiver, wherein said channel related data is associated with a particular location corresponding to a current location of said first transceiver relative to said network transceiver;
determining that a second transceiver from said plurality of transceivers in said transportation object is moving into said particular location due to movement of said transportation object;
providing said channel related data to said second transceiver; and
using said channel related data for communicating via said one or more communication channels with said second transceiver.

2. The method of claim 1, comprising communicating via said one or more communication channels using one or more cooperative communication schemes.

3. The method of claim 2, wherein said one or more cooperative communication schemes comprise one or both of:
use of spatial diversity by concurrently transmitting a signal on all of said one or more communication channels; and
use of spatial multiplexing by transmitting different segments of said signal via different ones of said one or more communication channels.

4. The method of claim 1, comprising transmitting from said transportation object to said network transceiver, one or more of:
said channel related data;
information relating to movement of said transportation object; and
information relating to relative positions of said plurality of transceivers within said transportation object.

5. The method of claim 1, comprising determining said channel related data based on one or both of:
information relating to movement of said transportation object; and information relating to relative positions of said plurality of transceivers within said transportation object.

6. The method of one of claim 1, wherein said determining of said channel related data comprises one or both of:
performing channel related measurement in said first transceiver in said moving direction of said transportation object; and
performing channel related measurement in said network transceiver.

7. The method of claim 1, wherein said plurality of transceivers is arranged in said transportation object such that each one of said plurality of transceivers travels through a same path when said transportation object is moving.

8. The method of claim 1, comprising establishing one or more virtual multiple-input and multiple-output (MIMO) arrays for use during communications between said transportation object and said communication network.

9. The method of claim 2, wherein each virtual MIMO array comprises at least one network transceiver of said communication network and at least two of said plurality of transceivers.

10. The method of claim 2, comprising communicating concurrently via multiple communication channels of at least one virtual MIMO array, wherein each communication channel is set up between one of said plurality of transceivers and a transceiver of said communication network.

11. The method of one of claim 1, wherein said determining of said channel related data comprises one or both of:
performing channel related measurement in said first transceiver in said moving direction of said transportation object; and
performing channel related measurement in said network transceiver.

12. A system for use in a transportation object to provide wireless communication, the system comprising:
a plurality of transceivers; and
one or more communication circuits operable to:
setup up one or more communication channels for communicating between a first transceiver from said plurality of transceivers and a network transceiver of a communication network that is in proximity to said transportation object;
determine channel related data for said first transceiver, wherein said channel related data is associated with a particular location corresponding to a current location of said first transceiver relative to said network transceiver;
determine that a second transceiver from said plurality of transceivers in said transportation object is moving into said particular location due to movement of said transportation object;
provide said channel related data to said second transceiver from said plurality of transceivers in said transportation object; and
utilize said channel related data for communicating via said one or more communication channels with said second transceiver.

13. The system of claim 12, wherein said one or more communication circuits operable to utilize one or more cooperative communication schemes for communicating via said one or more communication channels.

14. The system of claim 13, wherein said one or more cooperative communication schemes comprise one or both of:
use of spatial diversity by concurrently transmitting a signal on all of said one or more communication channels; and
use of spatial multiplexing by transmitting different segments of said signal via different ones of said one or more communication channels.

15. The system of claim 12, wherein said one or more communication circuits operable to transmit to said network transceiver, one or more of:
said channel related data;
information relating to movement of said transportation object; and
information relating to relative positions of said plurality of transceivers within said transportation object.

16. The system of claim 12, wherein said one or more communication circuits operable to determine said channel related data based on one or both of:
information relating to movement of said transportation object; and
information relating to relative positions of said plurality of transceivers within said transportation object.

17. The system of claim 12, wherein said plurality of transceivers is arranged in said transportation object such that each one of said plurality of transceivers travels through a same path when said transportation object is moving.

18. The system of claim 12, wherein said one or more communication circuits operable to establish one or more virtual multiple-input and multiple-output (MIMO) arrays for use during communications with said communication network.

19. The system of claim 18, wherein each virtual MIMO array comprises at least one network transceiver of said communication network and at least two of said plurality of transceivers.

20. The system of claim 18, wherein said one or more communication circuits operable to communicate concurrently via multiple communication channels of at least one virtual MIMO array, wherein each communication channel is set up between one of said plurality of transceivers and a transceiver of said communication network.

* * * * *